US012054181B2

(12) United States Patent
Alibeiginabi et al.

(10) Patent No.: US 12,054,181 B2
(45) Date of Patent: Aug. 6, 2024

(54) SYSTEM AND METHOD FOR ESTIMATING TAKE-OVER TIME

(71) Applicant: ZENUITY AB, Gothenburg (SE)

(72) Inventors: Mina Alibeiginabi, Gothenburg (SE); Majid Khorsand Vakilzadeh, Mölndal (SE)

(73) Assignee: ZENUITY AB, Gothenburg (SE)

( * ) Notice: Subject to any disclaimer, the term of this patent is extended or adjusted under 35 U.S.C. 154(b) by 559 days.

(21) Appl. No.: 17/332,143

(22) Filed: May 27, 2021

(65) Prior Publication Data

US 2021/0370984 A1 Dec. 2, 2021

(30) Foreign Application Priority Data

May 28, 2020 (EP) .................................... 20177009

(51) Int. Cl.
*B60W 60/00* (2020.01)
*B60W 50/06* (2006.01)
(Continued)

(52) U.S. Cl.
CPC ........ *B60W 60/0057* (2020.02); *B60W 50/06* (2013.01); *B60W 60/0051* (2020.02);
(Continued)

(58) Field of Classification Search
CPC ............. B60W 60/0057; B60W 50/06; B60W 60/0051; B60W 60/0055; B60W 2050/0088; B60W 2540/229; B60W 2540/30; B60W 2556/45; B60W 2050/0008; B60W 2050/0075; B60W 2540/22; B60W 2540/225; B60W 2556/10; B60W 50/0098; B60W 2050/0083; B60W 60/0053; B60W 60/005; B60W 60/0059;
(Continued)

(56) References Cited

U.S. PATENT DOCUMENTS 10,241,512 B1 * 3/2019 Chan .................... G06F 18/2413
10,829,129 B2 * 11/2020 Mimura .............. B60W 50/082
(Continued)

FOREIGN PATENT DOCUMENTS

CN 105264450 A * 1/2016 ............ B60W 30/00
CN 107298105 A * 10/2017 ............ B60W 40/00
(Continued)

OTHER PUBLICATIONS

Extended European Search Report mailed Nov. 16, 2020 for European Patent Application No. 20177009.6, 8 pages.

*Primary Examiner* — Peter D Nolan
*Assistant Examiner* — Peter Y Ning
(74) *Attorney, Agent, or Firm* — Sage Patent Group

(57) ABSTRACT

The present disclosure relates to systems and methods capable of adaptively estimating time-to-take over during ODD exit events, by estimating the recovery time for driver and the action time required to safely handle the situation. In more detail, the proposed system allows for field monitoring for online verification (i.e., in-vehicle verification) of adaptive hand over time, and for facilitated updating of the systems predicting the hand-over time (i.e., Action Time Network and Reaction Time Network) in a decoupled manner by efficient use of data from field monitoring.

15 Claims, 7 Drawing Sheets

(51) Int. Cl.
*G05D 1/00* (2006.01)
*B60W 50/00* (2006.01)

(52) U.S. Cl.
CPC ....... *B60W 60/0055* (2020.02); *G05D 1/0061* (2013.01); *B60W 2050/0088* (2013.01); *B60W 2540/229* (2020.02); *B60W 2540/30* (2013.01); *B60W 2556/45* (2020.02)

(58) Field of Classification Search
CPC ............ B60W 2555/20; G05D 1/0061; G05D 2201/0213
See application file for complete search history.

(56) References Cited

U.S. PATENT DOCUMENTS

| | | | | |
|---|---|---|---|---|
| 2016/0214612 A1* | 7/2016 | Kashiba | ............ | B60W 60/0053 |
| 2016/0246298 A1* | 8/2016 | Sato | ...................... | B60W 40/08 |
| 2017/0261981 A1* | 9/2017 | Ichikawa | ............ | B60W 50/082 |
| 2017/0329330 A1* | 11/2017 | Hatano | ............. | B60W 60/0051 |
| 2017/0368936 A1* | 12/2017 | Kojima | ................ | B60W 40/09 |
| 2018/0088574 A1* | 3/2018 | Latotzki | ............. | B60W 30/095 |
| 2021/0061299 A1* | 3/2021 | Wang | .................... | B60W 40/09 |
| 2022/0194433 A1* | 6/2022 | Nagata | ................ | G08G 1/0969 |
| 2023/0054024 A1* | 2/2023 | Oba | ........................ | A61B 5/18 |

FOREIGN PATENT DOCUMENTS

| | | | | |
|---|---|---|---|---|
| CN | 109204325 A | * | 1/2019 | ............... B60Q 9/00 |
| DE | 102012112802 A1 | | 6/2014 | |
| DE | 102012112802 A1 | * | 6/2014 | ............ B60W 50/14 |
| DE | 102014214777 A1 | * | 1/2016 | ............ B60W 40/09 |
| DE | 102015205580 A1 | * | 9/2016 | ............ B60W 50/14 |
| DE | 102017104255 A1 | * | 9/2017 | ......... B60W 50/082 |
| DE | 102017004845 A1 | * | 12/2017 | |
| DE | 102017004845 A1 | | 12/2017 | |
| DE | 102018212286 A1 | * | 1/2020 | ............ B60W 40/08 |
| EP | 3381758 A1 | * | 10/2018 | ............ B60W 50/14 |
| EP | 3381758 A1 | | 10/2018 | |
| EP | 3809227 A1 | * | 4/2021 | ............ B60K 28/06 |
| EP | 3690709 B1 | * | 11/2023 | ............ B60W 30/08 |
| JP | 2015210660 A | * | 11/2015 | |
| KR | 20220168458 A | * | 12/2022 | |
| WO | WO-2016092796 A1 | * | 6/2016 | ......... B60K 28/066 |
| WO | WO-2017187759 A1 | * | 11/2017 | ............ B60Q 9/00 |
| WO | WO-2018150676 A1 | * | 8/2018 | ......... B60W 30/182 |
| WO | WO-2019122968 A1 | * | 6/2019 | ............ B60W 40/08 |

\* cited by examiner

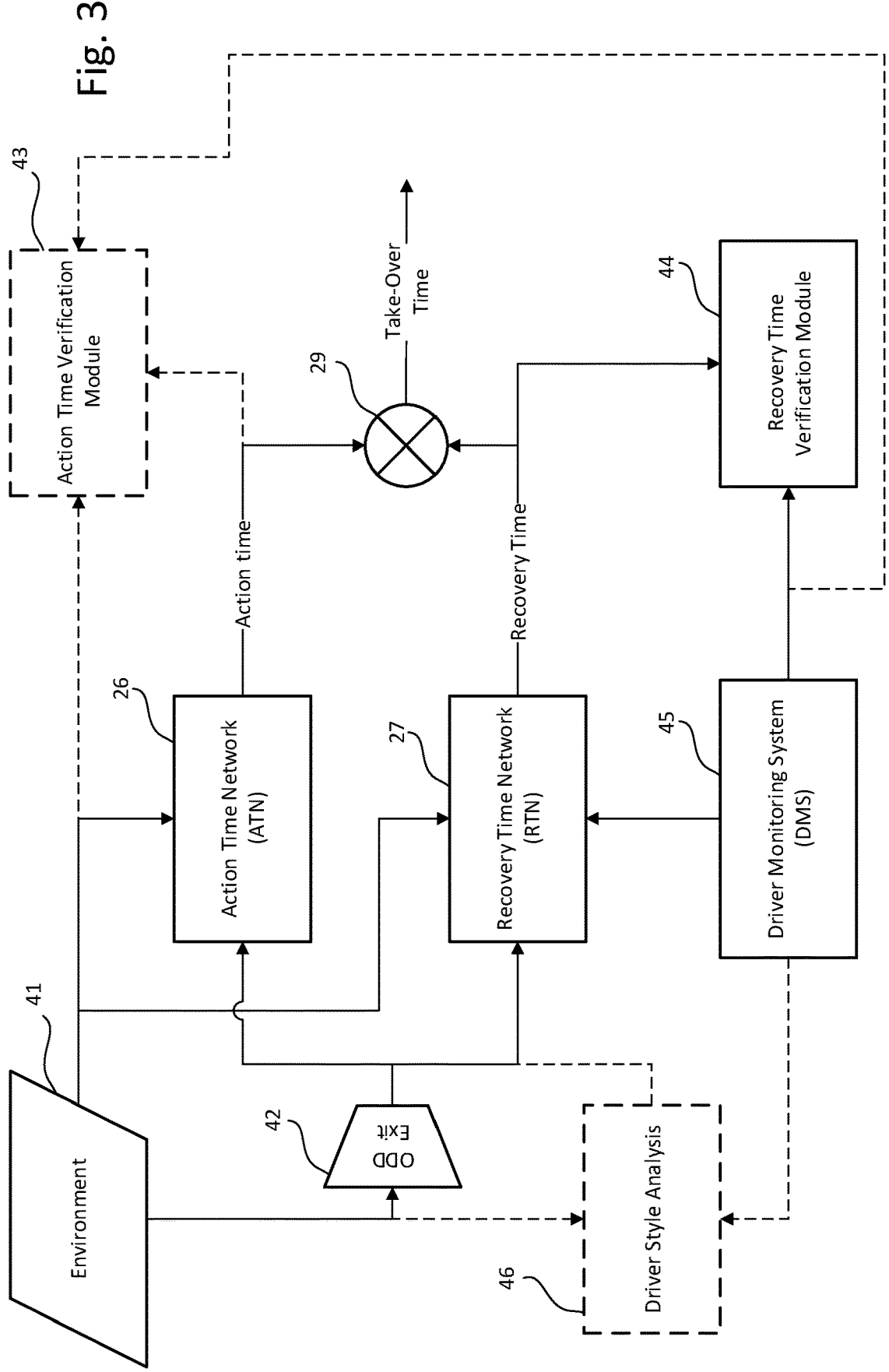

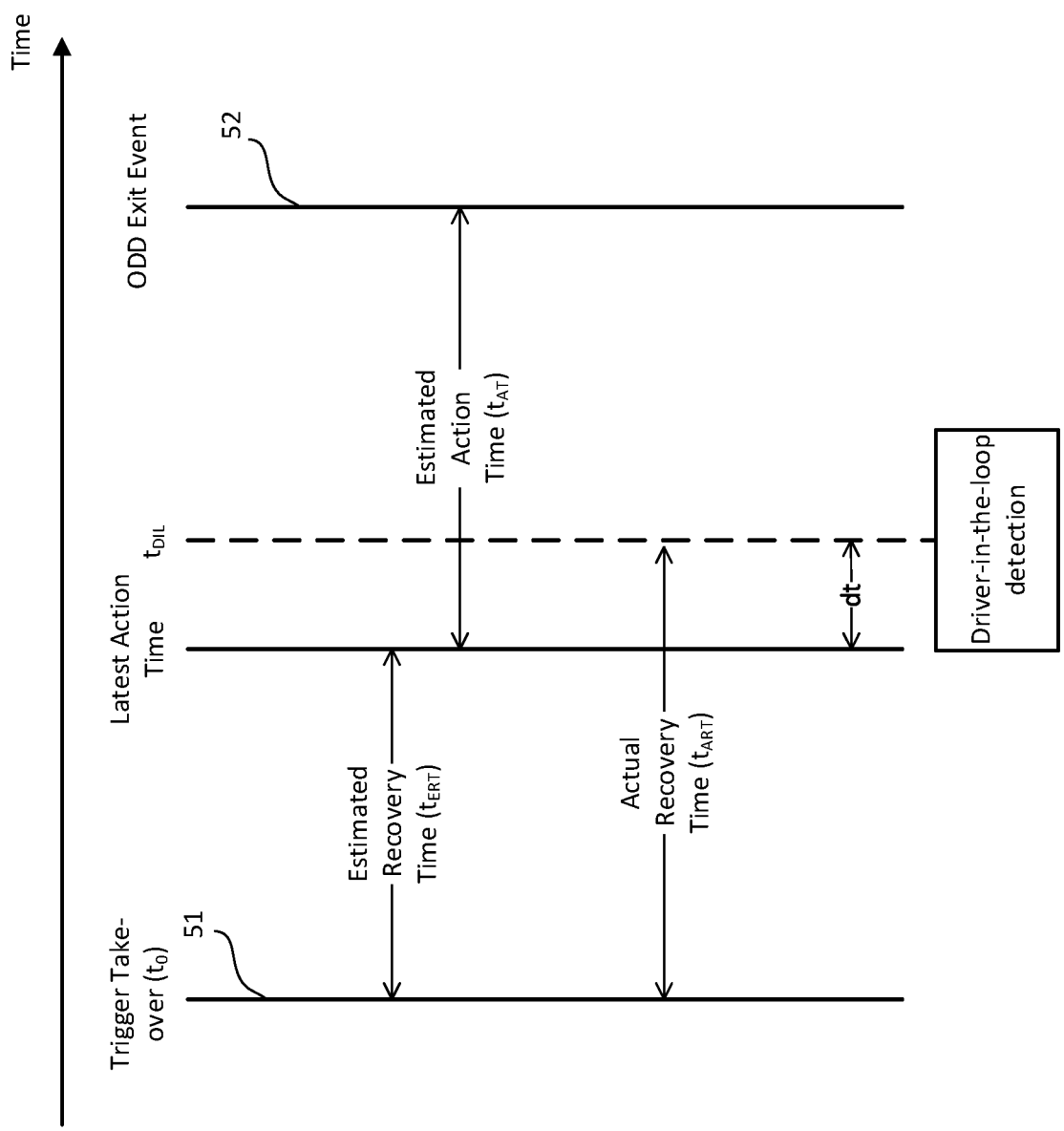

SYSTEM AND METHOD FOR ESTIMATING TAKE-OVER TIME

CROSS-REFERENCE TO RELATED APPLICATIONS

The present application for patent claims priority to European Patent Office Application Ser. No. 20177009.6, entitled "SYSTEM AND METHOD FOR ESTIMATING TAKE-OVER TIME" filed on May 28, 2020, assigned to the assignee hereof, and expressly incorporated herein by reference.

TECHNICAL FIELD OF THE INVENTION

The present disclosure relates to Automated Driving Systems (ADS) for road vehicle such as cars, busses, and trucks. More specifically, the present disclosure relates to systems and methods for managing a hand-over from an ADS feature to a driver of a vehicle.

BACKGROUND

During these last few years, the development of autonomous vehicles has exploded and many different solutions are being explored. Today, development is ongoing in both autonomous driving (AD) and advanced driver-assistance systems (ADAS), i.e., semi-autonomous driving, within a number of different technical areas within these fields. ADAS and AD may be generally referred to under the common term Automated Driving Systems (ADS) having different levels of automation as for example defined by the SAE J3016 levels of driving automation. One such area is how to ensure that a hand-over from an ADS feature to a driver of the vehicle is executed in a safe and reliable manner It is envisioned that during autonomous driving, an occupant of the vehicle will be able to devote himself at least partially to other activities. However, still today there are no available autonomous solutions that are fully capable of performing autonomous driving in all scenarios, and at all road sections. Accordingly, at least for the time being, when an Automated Driving System (ADS) feature recognizes an upcoming road or traffic scenario where the feature will likely be unable to perform the autonomous driving to a full extent, the feature will then ask the occupant (i.e., driver) to take over control of the vehicle. This may also be triggered by one or more sensors or other subsystems of the vehicle detecting a performance degradation or an outright failure of the ADS feature wherefore a handover (hand-over) to the driver may be initiated. The taking over of control of the vehicle is often referred to as a handover/hand-off.

To operate safely during the transition phase from autonomous to semi-autonomous or manual driving, a control system is often configured to implement such a safe transition. An important input to this control system is the required time for the driver to come back in the loop and take over the control of the vehicle as well as the time required by the system to be able to handle the situation in a safe manner eventually.

There is accordingly a need for new and improved solutions to ensure that a driver of an autonomous vehicle is prepared to retake control when automation needs to be ended.

SUMMARY OF THE INVENTION

It is therefore an object of the present disclosure to provide a system for estimating a take-over time for an Operational Design Domain (ODD) exit event for an autonomous vehicle, a vehicle comprising such a system, a corresponding method, and computer-readable storage medium which alleviate or mitigate all or at least some of the drawbacks of presently known solutions.

It is an object of the present disclosure to provide a solution for dynamically estimating a take-over time for an Operational Design Domain (ODD) exit event for an autonomous vehicle that can be monitored and verified once deployed in an autonomous vehicle fleet and which allows for a simple and efficient update process as more data is collected.

This object is achieved by means of a system for estimating a take-over time for an Operational Design Domain (ODD) exit event for an autonomous vehicle, a vehicle comprising such a system, a corresponding method, and computer-readable storage medium as defined in the appended claims. The term exemplary is in the present context to be understood as serving as an instance, example or illustration.

According to a first aspect of the present disclosure, there is provided system for estimating a take-over time for an ODD exit event for an autonomous vehicle. The take-over time is indicative of a time needed to delegate a driving task from a first ADS feature of the vehicle to a driver of the vehicle or a second ADS feature of the vehicle. The system comprises a trained Action Time Network (ATN) and a trained Recovery Time Network (RTN). The ATN is configured to output an action time indicative of a time needed to handle the ODD exit event by performing one or more vehicle manoeuvres. The RTN is configured to output a recovery time indicative of a time needed for the driver to reach an attentiveness level above an attentiveness threshold based on a current status of the driver. The system further comprises control circuitry configured to obtain a set of driver status parameters from a driver monitoring system (DMS) of the vehicle.

The set of driver status parameters are indicative of a current attentiveness level of a driver of the vehicle. Moreover, upon obtaining a signal indicative of an impending ODD exit event, the control circuitry is configured to estimate, by means of the ATN, an action time ($t_{AT}$) for the impending ODD exit event, and to estimate, by means of the RTN, a recovery time ($t_{ERT}$) for the impending ODD exit event based on the obtained set of driver status parameters. The control circuitry is further configured to generate, at an output, a hand-over request signal at a first point in time ($t_0$), and to determine a second point in time ($t_{DIL}$) when the driver reaches an attentiveness level above the attentiveness threshold in order to obtain an actual time needed for recovery ($t_{ART}$). Furthermore, the control circuitry is configured to compare the actual time needed for recovery ($t_{ART}$) with the estimated recovery time ($t_{ERT}$) against a recovery time threshold, and determine if the comparison indicates a deviation above the recovery time threshold. Accordingly, if a deviation above the recovery time threshold is determined, the control circuitry is configured to transmit RTN data to a remote entity for globally updating the RTN based on the transmitted RTN data. Moreover, the control circuitry is configured to obtain an updated RTN from the remote entity.

The method provides a means for estimating a time needed to delegate the responsibility of the manoeuvring of the vehicle from an autonomous driving feature/system to a driver or another system requiring the driver to be "in-the-loop". More specifically, the present disclosure provides a solution that allows verification of the estimated times and means to update the parts responsible for generating these estimates in a simple and efficient manner The term action time refers to the time needed for the driver or second ADS feature to perform the take over such that the ODD exit is performed in a safe manner For example, if the first ADS feature is a highway pilot and the ODD exit event is a highway exit, and the control of the vehicle is to be handed over to the driver. Then, the action time may for example be the estimated time that it takes for the driver of the vehicle to move the vehicle to the "exit lane" and to execute the exit in a safe manner However, preferably the action time also covers the time needed for the first ADS feature to execute a Minimum Risk Condition (MRC) manoeuvre in order to avoid potential collisions in case the system never detects that the driver has reached the attentiveness level above the attentiveness threshold. In reference to the same example as above, the MRC manoeuvre may for example be stop at a road shoulder.

The term recovery time refers to the time needed for the driver of the vehicle to reach a suitable attentiveness level such that it can reasonably be considered that the driver has taken over responsibility of the vehicle. It should be noted that this not necessarily mean that the driver has to take over the manoeuvring but it also covers situations where the control of the vehicle is handed over to an ADS feature that requires driver supervision. An example of such a feature would be a "highway assist" feature that includes a Lane Keeping Assist (LKA) feature and an Adaptive Cruise Control (ACC) feature.

Further, in accordance with a second aspect of the present disclosure, there is provided a vehicle comprising a first ADS feature and a second ADS feature. The vehicle further has a perception system comprising at least one sensor for monitoring a surrounding environment of the vehicle, and a localization system for monitoring a geographical position of the vehicle. Furthermore, the vehicle has a Driver Monitoring System (DMS) configured to monitor a driver status of an occupant of the vehicle, and a system for estimating a take-over time for an ODD exit event according to any one of the embodiments disclosed herein. With this aspect of the disclosure, similar advantages and preferred features are present as in the previously discussed first aspect of the disclosure.

According to a third aspect of the present disclosure, there is provided a method for updating a system for estimating a take-over time for an ODD exit event for an autonomous vehicle. The take-over time is indicative of a time needed to delegate a driving task from a first ADS feature of the vehicle to a driver of the vehicle or a second ADS feature of the vehicle. Moreover, the system for estimating a take-over time comprises a trained Action Time Network (ATN) and a trained Recovery Time Network (RTN). The ATN is configured to output an action time indicative of a time needed to handle the ODD exit event by performing one or more vehicle manoeuvres. The RTN is configured to output a recovery time indicative of a time needed for the driver to reach an attentiveness level above an attentiveness threshold based on a current status of the driver. The method comprises obtaining a set of driver status parameters from a driver monitoring system (DMS) of the vehicle. The set of driver status parameters are indicative of a current attentiveness level of a driver of the vehicle. Moreover, upon obtaining a signal indicative of an impending ODD exit event, the method comprises estimating, by means of the ATN, an action time ($t_{AT}$) for the impending ODD exit event, and estimating, by means of the RTN, a recovery time ($t_{ERT}$) for the impending ODD exit event based on the obtained set of driver status parameters. The method further comprises generating a hand-over request signal at a first point in time ($t_0$), and determining a second point in time ($t_{DIL}$), after the first point in time, when the driver reaches an attentiveness level above the attentiveness threshold in order to obtain an actual time needed for recovery ($t_{ART}$). Furthermore, the method comprises comparing the actual time needed for recovery ($t_{ART}$) with the estimated recovery time ($t_{ERT}$) with a recovery time threshold. Accordingly, if the comparison indicates a deviation above the recovery time threshold, the method comprises transmitting RTN data to a remote entity for globally updating the RTN based on the transmitted RTN data. The method further may further comprise a step of obtaining an updated RTN from the remote entity. With this aspect of the disclosure, similar advantages and preferred features are present as in the previously discussed first aspect of the disclosure.

In accordance with a fourth aspect of the present disclosure, there is provided a (non-transitory) computer-readable storage medium storing one or more programs configured to be executed by one or more processors of a vehicle control system, the one or more programs comprising instructions for performing the method according to any one of the embodiments disclosed herein. With this aspect of the disclosure, similar advantages and preferred features are present as in the previously discussed first aspect of the disclosure.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF FIGURES

Further objects, features and advantages of embodiments of the disclosure will appear from the following detailed description, reference being made to the accompanying drawings, in which:

FIG. 3 is a schematic block diagram representation of a system for estimating a take-over time for an Operational Design Domain (ODD) exit event for an autonomous vehicle in accordance with an embodiment of the present disclosure.

FIG. 4a is a schematic overview over time of a method for estimating a take-over time for an Operational Design Domain (ODD) exit event for an autonomous vehicle in accordance with an embodiment of the present disclosure.

DETAILED DESCRIPTION

Figure 1:
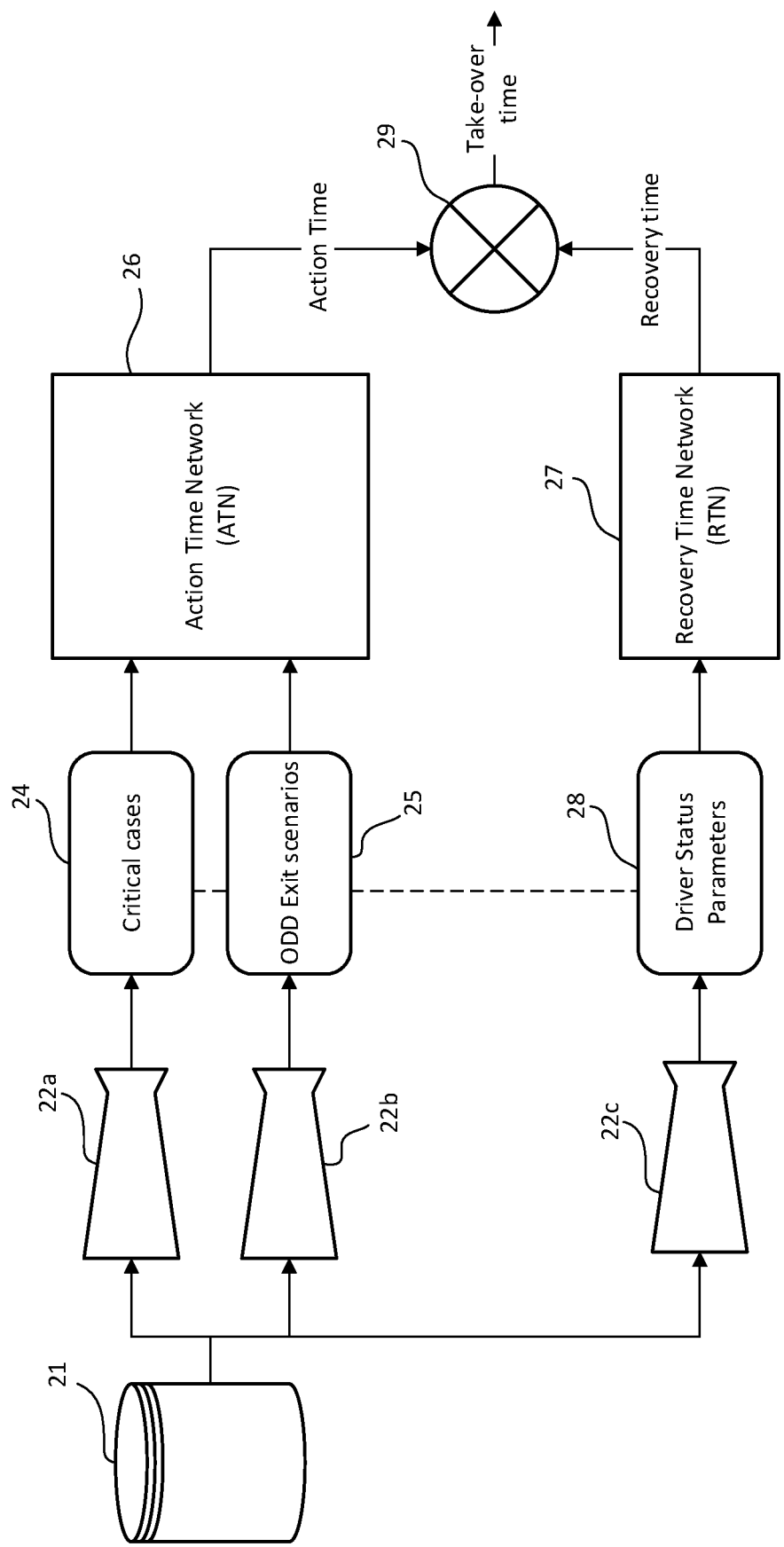
FIG. 1 is schematic block diagram representation of a process for building a system for estimating a take-over time for an Operational Design Domain (ODD) exit event for an autonomous vehicle in accordance with an embodiment of the present disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Herein, the term ADS or autonomous driving feature may refer to any arbitrary ADS, ADAS or AD feature, e.g., as already known in the art and/or yet to be developed. An Operational design domain (ODD) is to be understood as a description of the operating domains in which an automated or a semi-automated driving system (i.e., AD or ADAS) is designed to function, including, but not limited to, geographic, roadway (e.g., type, surface, geometry, edges and markings), environmental parameters, connectivity, surrounding objects, traffic parameters, and speed limitations. Accordingly, an ODD exit event may be understood as an event where the vehicle operated by the ADS feature is approaching the limit of the Dynamic Driving Task (DDT), for which it is has been configured to handle autonomously, and from which point after, human supervision is required.

FIG. 1 is schematic block diagram representation of a process for building a system for estimating a take-over time for an Operational Design Domain (ODD) exit event for an autonomous vehicle in accordance with an embodiment of the present disclosure. In more detail, FIG. 1 illustrates how the two de-coupled artificial neural networks 26, 27 (e.g., may also be referred to as self-learning models) are trained using machine learning methods such as e.g., imitation learning in order to estimate the take-over time.

As defined herein, the take-over time, i.e., the length of the transition phase from autonomous to semi-autonomous or manual driving, comprises an "action time" and a "recovery time". The action time is defined as the time needed for second ADS feature or the driver to perform the necessary actions to complete the hand-over. The recovery time is defined as the time needed for the driver of the vehicle to reach a necessary attentiveness level (i.e., to reach an attentiveness level that indicates that the driver has resumed responsibility of the driving task).

In a specific example, the first ADS feature is a highway pilot and the ODD exit event is a highway exit, and the hand-over is from the first ADS feature to the driver. Accordingly, the first ADS feature may prepare the ODD exit event by manoeuvring the vehicle to the right lane, and reducing the speed from 100 km/h to 80 km/h. Thus, the action time is the estimated time it takes for the driver or the second ADS feature to move the vehicle to the exit lane and further reduce the speed to a suitable level, i.e., to perform the necessary actions so that the highway exit is executed in a safe manner The recovery time in this case, as well as in any other case herein, is an estimation of the time needed for the driver to reach a sufficient level of attentiveness to be considered to have resumed responsibility of the driving task in order to perform the aforementioned actions based on a current "driver status" and optionally on the environment (i.e., environmental parameters). The driver status is quantified by a set of parameters 28 and may for example comprise a gaze direction, a time duration in AD mode, age or gender of the driver, stress level of the driver, Human-Machine-Interface (HMI) parameters, how many passengers are on-board, number of children on-board, number of animals on-board, etc. The environmental parameters may for example comprise current weather conditions, time of day, and the like.

The HMI parameters may for example be indicative of the capability of the HMI, i.e., the manner in which the hand-over request may be presented to the driver. For example, if the HMI of a first vehicle is only capable of only presenting visual cues to the driver, while the HMI of a second vehicle is capable of presenting visual, tactile, and audio cues. Then, given all other driver status parameters equal, a system according to the present disclosure implemented in both vehicles may conclude a lower recovery time in the second vehicle as compared to the first vehicle.

In another specific example, the first ADS feature is a highway pilot and the ODD exit event is an approaching roadwork on the highway. Similarly as before, the hand-over is from the first ADS feature to the driver. Accordingly, the action to be performed may be to slow down from 100 km/h to 50 km/h, then the action time is the time it takes to slow down in a safe, and optionally, comfortable manner The recovery time is defined and determined as described in the previous example.

In yet another specific example, the first ADS feature is a highway pilot feature and the ODD exit event is an approaching segment of the highway without road barriers on both sides. In this case, the hand-over is from the highway pilot feature to a second ADS feature in the form of a Lane Keeping Assist feature (which is herein considered to be an "ADAS feature" that requires "driver supervision").

Then there may be no action to be performed to perform the handover, and the estimated action time is estimated to be zero. However, since the second ADS feature requires the driver to be "in-the-loop", a recovery time is estimated based on a current status of the driver and optionally on the environment as presented above.

Returning to FIG. 1, for the training of the ATN 26 one may extract all misses or "near misses" (denoted as Critical cases 24 in the figure) considering the safety norm and system capability 22a from the stored data 21. Safety norm may be understood as an understanding of the safety goal for various events, which will render scenarios that should be safely handled by the ADS. System capability may be construed as an understanding of the limits of the vehicle platform, software capabilities, etc. Additionally, one may extract the scenarios corresponding to ODD exit scenarios 25 from specific use cases 22b (such as e.g., traffic jam pilot in a specified geographical region, or highway pilot in a specified geographical region, etc.). For example, by the definition of the ODD for a defined ADS feature, it is specified that the affected ADS feature is configured to operate only on European or American highways with certain characteristics (e.g., no traffic lights, no junctions, barriers present, etc.) with a specified maximum speed limit. Thus, the ADS feature should be deactivated when the vehicle approaches the "outer boundary" of the ODD, wherefore a take-over procedure is needed. These rules for the ADS feature may for example originate from requirements/specifications of the ADS feature, and a dedicated module may be implemented to detect these ODD exit scenarios.

In summary, the ATN 26 is trained to generate an action time by means of conventional machine learning methods, where the training data is based on historical data indicative of an ODD exit. The input to the ATN may for example be perception data (e.g., information from various sensors such as radar, LIDAR, cameras, etc.), localization data (e.g., information from a Global Navigation Satellite System (GNSS), and HD map data). Moreover, the perception data may be indicative of weather conditions, road conditions, landmarks, traffic participants, etc.

The RTN 27 on the other hand is trained to generate a recovery time based on historical data collected from e.g. a Driver Monitoring System (DMS), driver-in-the-loop detectors, and other vehicle control systems in various driving scenarios. In more detail, the training data from the RTN may be based on scenarios 22c where a hand-over request was generated and presented to the driver and where a driver-in-the-loop detector subsequently determined that the driver has reached a sufficient attentiveness level in each scenario. Then, the RTN may be trained to predict a recovery time given the training data of the various driver and environmental status parameters in those scenarios, using conventional machine learning methods.

Figure 2:
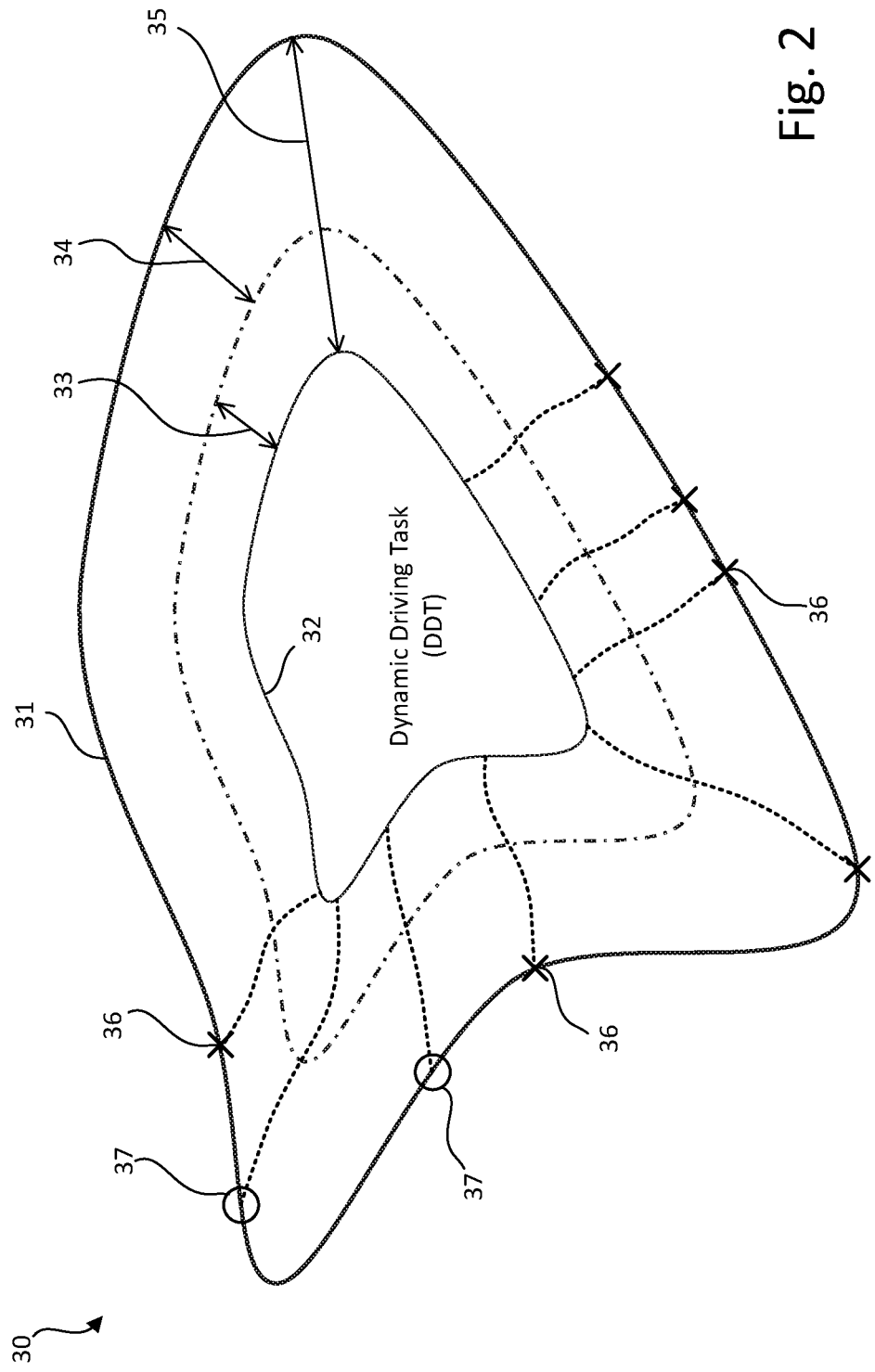
FIG. 2 is schematic illustration of an ODD for an autonomous vehicle in accordance with an embodiment of the present disclosure.

FIG. 2 illustrates how the training data may be selected in reference to a defined ODD 30 of an ADS feature. The outer border 31 represents the "ODD border", i.e., various "ODD exit events", and the x-marked points 36 on the border correspond to failures that have been extracted from historical data. In more detail, the x-marked points 36 indicate events or scenarios that the ADS feature failed to handle, and tracing back from these x-marked points 36 one can estimate the "border" 32 of the Dynamic Driving Task (DDT). In short, the ATN and RTN may be trained by tracing back from these failures 36 (as indicated by the dotted lines) in order to analyze the full scenarios that lead to the failure 36. Then, the ATN and RTN are trained to determine a suitable recovery time 33 and action time 34 based on this historical data. The recovery time 33 and action time 34 define the total take-over time 35 wherefrom one can define the DDT border 32 of the ODD that indicates a suitable timing/scenario for the take-over/hand-over request to be generated within the vehicle. Similarly, one can select further training data by extracting successful ODD exit events, as marked by the circles 37 on the ODD border 31, from historical data.

Further, FIG. 3 is a block diagram representation of a system for estimating a take-over time for an ODD exit event for an autonomous vehicle, in accordance with an embodiment of the present disclosure. As before, the take-over time is indicative of a time needed to delegate a driving task from a first ADS feature of the autonomous vehicle to a driver of the vehicle or a second ADS feature of the vehicle. Accordingly, the system proposed herein is capable of adaptively estimating a take-over time for a multitude of ODD exit scenarios, and which can further be updated and verified in a simple and efficient manner once it is deployed.

In other words, in order to operate safely during the transition phase from autonomous to semi-autonomous and manual driving, a control system is provided to implement such safe transition. An important parameter for this control system is the required time for the driver to come back in the loop and take over the control of the vehicle as well as the time required by the "receiving" party (i.e., driver or second ADS feature) to be able to handle the situation in a safe manner As described in the foregoing, the so-called time-to-take over can be learned from data resulting in a more responsive system. The present disclosure proposes a solution to adaptively estimate the time-to-takeover, and which can easily and efficiently be updated and verified based on data from plurality of autonomous vehicles.

The system comprises an Action Time Network (ATN) 26 that is configured to output an action time indicative of a time needed to handle the ODD exit event by performing one or more vehicle manoeuvres. The system also comprises a Recovery Time Network (RTN) that is configured to output a recovery time indicative of a time needed for the driver to reach an attentiveness level above an attentiveness threshold at least partly based on a status of the driver. The attentiveness level may for example be defined and controlled by a "driver-in-the-loop" detector that is configured to determine when the driver can be considered to have assumed control and responsibility of the driving task.

In more detail, the system has control circuitry configured to obtain a set of driver status parameters from a driver monitoring system (DMS) 25 of the vehicle. The set of driver status parameters are indicative of a current attentiveness level of a driver of the vehicle. The DMS 25 may accordingly comprise the "driver-in-the-loop" detector configured to generate, at an output, a signal indicating that the driver's attentiveness level is above the threshold, i.e. a signal indicating that the "driver is in the loop", and can be assumed responsible for the operation of the vehicle. The driver-in-the-loop detector may base its "conclusion" in various ways such as e.g., from DMS data and/or from a verification provided by the driver to a Human Machine Interface (HMI) of the vehicle.

Further, the control circuitry is configured to, upon obtaining a signal indicative of an impending ODD exit event:
Estimate, by means of the ATN, an action time ($t_{AT}$) for the impending ODD exit event, based on sensor data comprising information about a surrounding environment of the vehicle and information about the vehicle (e.g., speed, location, planned trajectory, etc.).

Estimate, by means of the RTN, a recovery time ($t_{ERT}$) for the impending ODD exit event based on the obtained set of driver status parameters, and optionally, further based on environmental status parameters.

The control circuitry is further configured to generate, at an output, a hand-over request signal at a first point in time ($t_0$). The hand-over request signal may for example be in the form of a visual, audio, and/or tactile cue presented to the driver via an HMI of the vehicle. Furthermore, the control circuitry is configured to determine a second point in time ($t_{DIL}$) when the driver reaches an attentiveness level above the threshold in order to obtain an actual time needed for recovery ($t_{ART}=|t_{DIL}-t_0|$). In other words, the point in time when a driver-in-the-loop module determines that the driver "is in the loop" ($t_{DIL}$). The actual time needed for recovery ($t_{ART}$) is then compared with the estimated recovery time ($t_{ERT}$) against a recovery time threshold. Thus, the term "determine a second point in time ($t_{DIL}$) when the driver reaches an attentiveness level above the threshold" may in some embodiments comprise receiving a signal indicative of that the driver has reached an attentiveness level above the threshold, the signal may e.g., be received from a driver-in-the-loop detector. However, in some embodiments, the control circuitry may be configured to determine the second point in time based on the obtained set of driver status parameters, i.e., the control circuitry may be configured to operate as a driver-in-the-loop detector.

The above process is schematically indicated in FIG. 4a that shows the time period between the hand-over request at time ($t_0$) 51 and the ODD exit event 52 and the corresponding estimations of the recovery time ($t_{ERT}$) and the action time ($t_{AT}$) together with the actual time needed for recovery ($t_{ART}$) in accordance with a first example embodiment. The actual time needed for recovery ($t_{ART}$) is as mentioned determined based on the point in time ($t_{DIL}$) when the driver is considered to be "in-the-loop".

Then, if the comparison indicates a deviation above the recovery time threshold (i.e., if $|t_{ERT}-t_{ART}|=dt>$threshold), the control circuitry is configured to transmit RTN data to a remote entity for offline processing. This process of verifying the accuracy/reliability of the RTN may for example be performed by a separate "recovery time verification module" 44 as schematically indicated in FIG. 3. In some embodiments, the RTN data is indicative of the actual time needed for recovery ($t_{ART}$) for the ODD exit event and of RTN input data used to estimate the recovery time ($t_{ERT}$). The RTN input data may for example be DMS data (driver status parameters), and optionally perception data or map data. Further, the control circuitry is configured to obtain an updated RTN from the remote entity, the updated RTN may be understood as a "global" RTN which is updated based on data retrieved from an entire fleet of vehicles having the system for estimating a take-over time for an ODD exit event according to any one of the embodiments disclosed herein.

However, in some embodiments, the control circuitry may be configured to locally update the RTN based on the actual time needed for recovery ($t_{ART}$), and the transmitted RTN data comprises a set of model parameters indicative of the locally updated RTN. Moving on, if the RTN is in the form of an artificial neural network, the transmitted model parameters may be the updated network weights. By only sending the model parameters instead of full data sets of the input data used by the RTN, a more bandwidth efficient means for identifying discrepancies over an entire fleet and globally updating the RTN may be achieved. This may be understood as a form of federated learning. In reference to the "local updating" of the RTN, in some embodiments the RTN may be in the form of a reinforcement-learning algorithm. Then, the difference between the estimated recovery time ($t_{ERT}$), and the actual time needed for recovery ($t_{ART}$) will decide whether the RTN should be rewarded or penalized, i.e., if the error in estimation is above the recovery time threshold, the RTN is penalized, and vice versa. However, as the skilled person readily understands other machine learning algorithms may be utilized. Moreover, there may be a need to utilize a threshold for a number of "erroneous" estimations that the RTN is allowed to generate before the relevant ADS feature is suppressed/inhibited from further activation.

The signal indicative of the impending ODD exit event may for example be obtained from a separate module 42 that monitors the vehicle's surroundings based on perception data 41 and localization data 41, and is configured to generate the signal indicative of an impending ODD exit. Preferably the ODD exit module 42 is configured to predict a time until ODD exit and to continuously update this prediction (based on e.g., an expected route of the vehicle), at least while the affected ADS feature is active.

Further, in some embodiments, the control circuitry is configured to obtain sensor data 41 comprising information about a surrounding environment of the autonomous vehicle. The control circuitry is further configured to, detect an ODD exit scenario, at a time of the ODD exit event, based on the obtained sensor data 41 and on the obtained driver status parameters, and to determine a set of "criticality parameters" indicative of a criticality level of the detected ODD exit scenario. The criticality level may be referred to as a "threat level", meaning that it is descriptive of how well the ODD exit was managed with respect to the vehicle occupants' safety. The set of criticality parameters may for example be occupant/passenger stress level (obtained from DMS data), closeness to external objects or barriers, lateral accelerations, longitudinal accelerations, used brake force, Time to Collision (TOC), Brake Threat Number (BTN), Steering Threat Number (STN), and so forth.

Accordingly, in one example embodiment the comparison between the actual time needed for recovery ($t_{ART}$) and the estimated recovery time ($t_{ERT}$) does not indicate the deviation above the recovery time threshold (i.e. the estimated recovery time ($t_{ERT}$) was sufficiently accurate) and the criticality level of the detected ODD exit scenario is above a criticality level threshold. Then, the control circuitry is further configured to transmit ATN data to the remote so that the ATN can be updated centrally by e.g., a central management system/back-office. Furthermore, the control circuitry is configured to obtain an updated ATN from the remote entity. The receiving and transmitting of data between the autonomous vehicle and the back-office may be performed depending on communication availability and predefined configurations as readily understood by the skilled reader. The process of estimating the criticality level and verifying the estimated action time ($t_{AT}$) as described above may for example be performed by a separate module 43 in the system as indicated in FIG. 3.

Figure 4B:
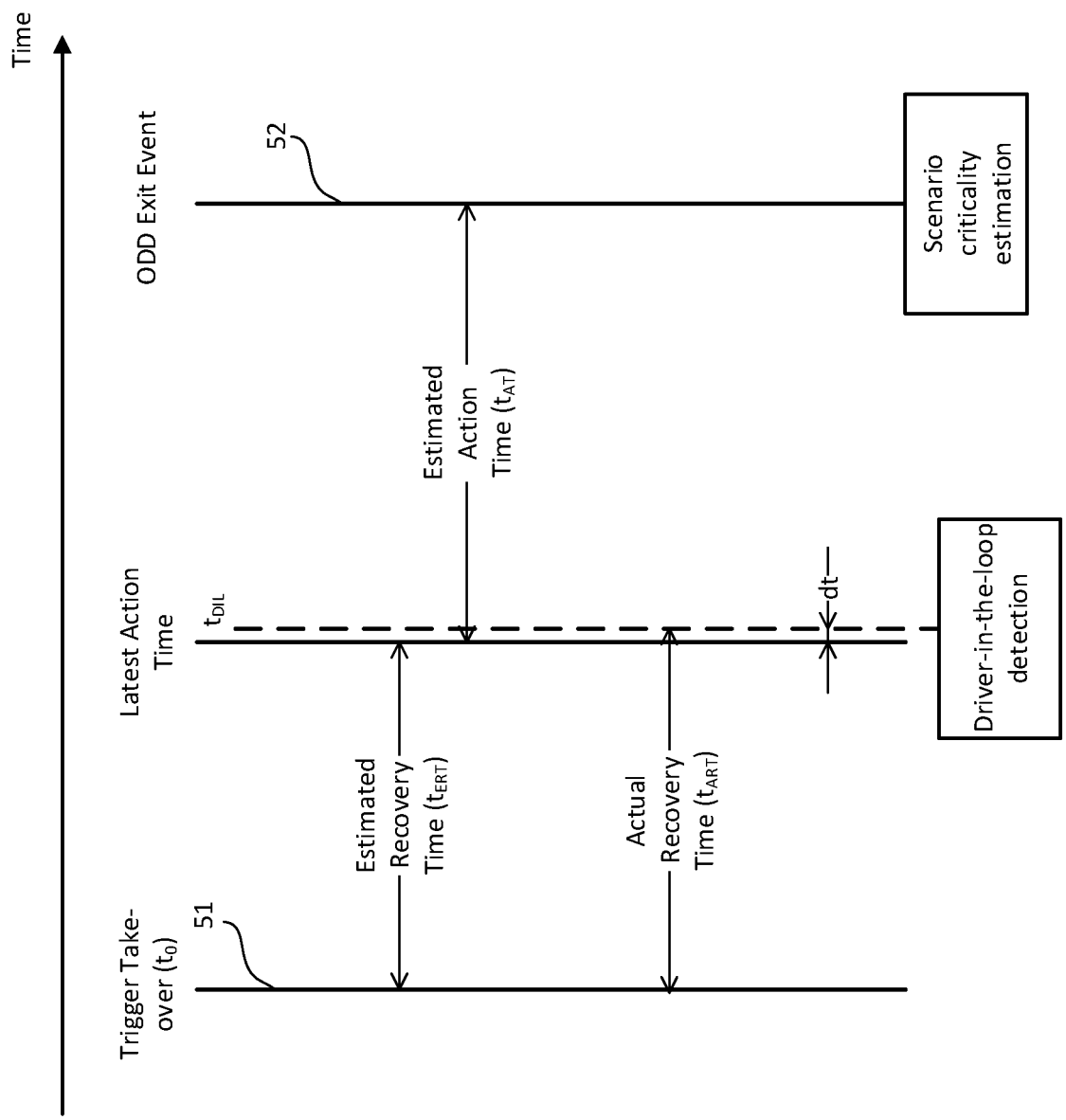
FIG. 4b is a schematic overview over time of a method for estimating a take-over time for an Operational Design Domain (ODD) exit event for an autonomous vehicle in accordance with an embodiment of the present disclosure.

The above process is schematically indicated in FIG. 4b that shows the time period between the hand-over request at time ($t_0$) 51 and the ODD exit event 52 and the corresponding estimations of the recovery time ($t_{ERT}$) and the action time ($t_{AT}$) together with the actual time needed for recovery ($t_{ART}$) in accordance with a second example embodiment. The actual time needed for recovery ($t_{ART}$) is as mentioned determined based on the point in time ($t_{DIL}$) when the driver is considered to be "in-the-loop". Here, the difference between the estimated recovery time ($t_{ERT}$) and the actual recovery time ($t_{ART}$) is below the recovery time threshold (i.e., if $|t_{ERT}-t_{ART}|=dt<threshold$). Thus, a scenario criticality estimation is performed at the point of ODD exit in order to evaluate/verify the estimated action time ($t_{AT}$).

The transmitted ATN data may for example be indicative of the criticality level of the ODD exit and of the ATN input data used to estimate the action time ($t_{AT}$). The ATN data may further be indicative of the estimated action time ($t_{AT}$). In some embodiments, the control circuitry is further configured to locally update the ATN based on the determined set of parameters indicative of the criticality level of the ODD exit scenario, and accordingly the transmitted ATN data comprises a set of model parameters indicative of the locally updated ATN to the remote entity. This may be understood as a form of federated learning. Analogously as discussed before with respect to the RTN, the ATN may be configured to be "locally self-learning" meaning that it is locally updated based on the result of the action time prediction where the criticality level is used as feedback. For example, if the ATN is a reinforcement-learning algorithm then the criticality level will be used to determine whether the ATN should be rewarded or penalized. Also, similarly as discussed with respect to the RTN, utilizing local updates and then only transmitting updated model parameters (e.g., network weights) may provide advantages in terms of bandwidth need and processing efficiency. However, as the skilled person readily understands other machine learning algorithms may be utilized. Moreover, there may be a need to utilize a threshold for a number of "erroneous" estimations that the RTN is allowed to generate before the relevant ADS feature is suppressed/inhibited from further activation.

Furthermore, in some embodiments, the system further has a driver style analysis module configured to analyse and evaluate a performance and attitude of the driver of the vehicle over a period of time and to determine driver profile of the driver of the vehicle. In more detail, the driver analysis module is configured to determine an experience level (e.g., novice, moderate, expert, etc.) and a driving style (e.g., aggressive, careful, normal, risky, etc.) of the driver in order to be able to more accurately determine the required recovery time for various ODD exit scenarios. The driver style analysis module may base the driver profile based on real-time data such as e.g., sensor data (e.g., acceleration profiles, braking profiles, steering profiles) and DMS data (e.g., age of the driver, attentiveness of the driver, etc.), and/or predefined data in the form of personal driver profiles stored in the vehicle.

Accordingly, the RTN may be configured to further use the determined driver profile to estimate the recovery time for various ODD exit events. The driver style analysis module may provide advantages in terms of take-over time prediction accuracy, and in particular for car-rental or car-sharing applications where a large number of drivers use the same vehicle and require individual adaptations of the RTN. In particular, the utilization of real-time data in order to determine a driver profile may be advantageous in such applications.

Moreover, in some embodiments, the ATN may also be configured to use the determined driver profile to estimate the action time. For instance, the action time for a cautious/conservative driver may be longer than for an aggressive driver. However, it is envisioned that for safety reasons, the ATN cannot predicts action times that suit a risky driver, but on the other hand it may adapt itself to a conservative driver and have a longer action time for such drivers.

In summary, a system is proposed that is capable of adaptively estimating time-to-take over during ODD exit events, by estimating the recovery time for driver and the action time required to safely handle the situation. In more detail, the proposed system allows for field monitoring for online verification (i.e., in-vehicle verification) of adaptive hand over time, and for facilitated updating of the systems predicting the hand-over time (i.e., ATN and RTN) in a decoupled manner by efficient use of data from field monitoring.

Furthermore, in some embodiments, the system may be configured to inhibit future activation of the ADS feature (in one or more geographical areas) in case of significant failures caused by errors in the estimated hand-over time. In more detail, the proposed solution allows for a central entity (herein referred to as remote entity) to aggregate data and evaluate the performance of the system from a fleet of autonomous vehicles, and if recurring or critical failures are detected, the central entity may transmit a signal indicative of an instruction to inhibit activation of the affected ADS feature in one or more specific geographical areas. Thereby improving overall road safety for autonomous vehicles.

The vehicle preferably also comprises a safety system or a collision avoidance system that is configured to initiate a minimum risk manoeuvre (MRC) in case the take-over time estimations are erroneous and the resulting situation warrants for such an action. However, such systems and their operational principles are considered to be readily known by the skilled person in the art, and will for the sake of brevity and conciseness not be further elaborated upon.

Figure 5:
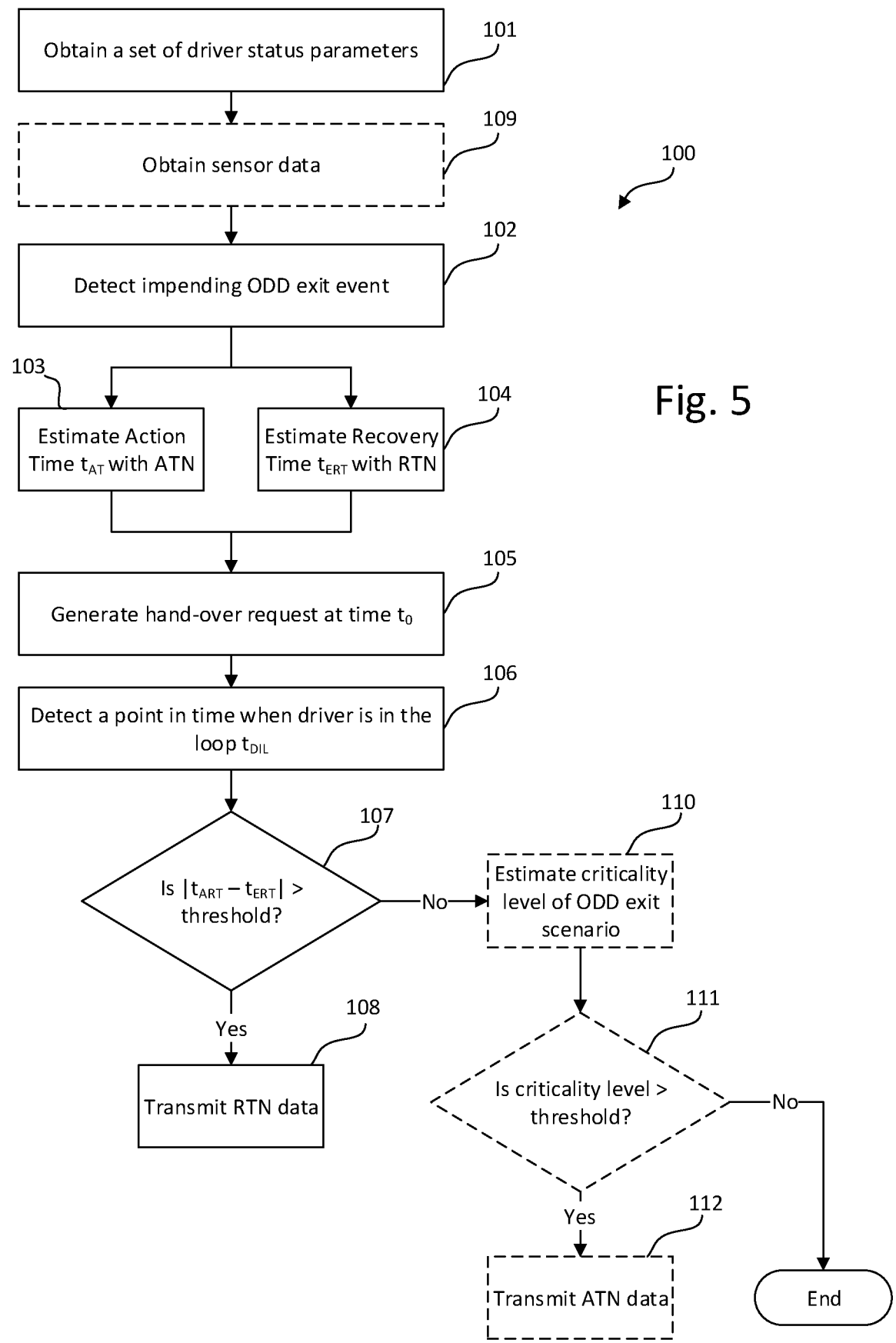
FIG. 5 is a schematic flow chart representation of a method updating a system for estimating a take-over time for an Operational Design Domain (ODD) exit event for an autonomous vehicle in accordance with an embodiment of the present disclosure.

FIG. 5 is a schematic flow chart representation of a method 100 for updating a system for estimating a take-over time for an Operational Design Domain (ODD) exit event for an autonomous vehicle in accordance with an embodiment of the present disclosure. The take over time is indicative of a time needed to delegate a driving task from a first ADS feature of the vehicle to a driver or a second ADS feature of the vehicle. The system accordingly comprises an Action Time Network (ATN) and a Recovery Time Network (RTN), configured to output an action time and a recovery time as defined in the foregoing. In more detail, the ATN is configured to output a signal indicative of a time needed to handle the ODD exit event by performing one or more vehicle manoeuvres, and the RTN is configured to output a signal indicative of a time needed for the driver to reach an attentiveness level above an attentiveness threshold based on a current status of the driver.

The method 100 comprises obtaining 101 a set of driver status parameters from a driver monitoring system (DMS) of the vehicle. The set of driver status parameters are indicative of a current attentiveness level of a driver of the vehicle. In other words, the driver status parameters comprise information, in real-time, of the driver's attentiveness level. Furthermore, upon obtaining 102 a signal indicative of an impending ODD exit event, the method 100 further comprises estimating 103, by means of the ATN, an action time ($t_{AT}$) for the impending ODD exit event and estimating, by means of the RTN, a recovery time ($t_{ERT}$) for the impending ODD exit event based on the obtained set of driver status parameters, and optionally on environmental parameters. The term obtaining is herein to be interpreted broadly and encompasses receiving, retrieving, collecting, acquiring, and so forth.

Further, the method 100 comprises, generating a handover request signal, at an output, at a first point in time ($t_0$). Then, a second point in time ($t_{DIL}$) is determined 106, where the second point in time ($t_{DIL}$) defines a time when the driver reaches an attentiveness threshold. This determination 106 may be based on the obtained set of driver status parameters, and may be referred to as a "driver-in-the-loop" detection. As previously mentioned, the determination 106 of the second point in time may comprise obtaining a confirmation signal from a "driver-in-the-loop detector". Accordingly, an actual time needed for recovery ($t_{ART}$) can be derived ($t_{ART}=|t_{DIL}-t_0|$).

Further, the method 100 comprises a step of comparing 107 the actual time needed for recovery ($t_{ART}$) with the estimated recovery time ($t_{ERT}$) with a recovery time threshold. Accordingly, if the comparison 107 indicates a deviation above the recovery time threshold, RTN data is transmitted 108 to a remote entity for globally updating the RTN based on the transmitted RTN data. The transmitted RTN data may be indicative of the actual time needed for recovery for the ODD exit event and of RTN input data used to estimate the recovery time ($t_{ERT}$). In other words, if the estimated recovery time ($t_{ERT}$) is deemed wrong above a tolerance level, the method 100 comprises transmitting the "correct" recovery time ($t_{ART}$) together with the data used to estimate the "wrong" recovery time ($t_{ERT}$) so that the RTN can be updated offline. Moreover, the method may comprise obtaining an updated RTN from the remote entity, e.g., receiving and processing a software update that updates the RTN of the vehicle.

However, if the comparison 107 indicated that there was no deviation above the recovery time threshold, the method 100 may comprise detecting an ODD exit scenario, at a time of the ODD exit event, based on obtained 109 sensor data and on the obtained 101 driver status parameters. Then a set of parameters indicative of a criticality level of the detected ODD exit scenario are determined 110. The term "detecting an ODD exit scenario" may for example comprise obtaining a world view at the time of ODD exit. For example, if the ODD is a highway fulfilling some criteria, the step of detecting an ODD exit scenario may be to derive a "world view" at the time when the vehicle exits the highway. The worldview preferably comprises a quantified state of the ego-vehicle (e.g., trajectory and pose), a quantified state of the surrounding environment (e.g., position of external objects relative to the ego-vehicle, trajectories of dynamic external objects, etc.) and a quantified state of the vehicle occupant(s) (e.g., gaze direction of the driver, stress level of the occupant(s), etc.). The term "at a time of the ODD exit event" should be interpreted broadly and does not necessarily mean at a single point in time, but may cover some time before and after the ODD exit event (e.g., 15 seconds before and 15 seconds after) in order to derive a correct "world view" including better estimates of trajectories and behaviours.

Moving on, once the criticality level has been estimated 110, it is compared 111 against a criticality level threshold, and if the criticality level is above the threshold ATN data is transmitted 112 to a remote entity for globally updating the ATN based on the transmitted ATN data. Analogously as for the RTN data, the ATN data is preferably indicative of the criticality level of the ODD exit event and of ATN input data used to estimate the action time ($t_{AT}$). In other words, the ATN data may comprise the criticality level (i.e., the reason as to why the ATN data is transmitted), the output of the "local" ATN (i.e., the estimated action time), and the input data which lead to the "erroneous" estimate.

Further, in some embodiments the system for estimating a take-over time further comprises a driver style analysis module configured to analyse and evaluate a performance and attitude of the driver of the vehicle over a time period and to determine driver profile of the driver of the vehicle. Accordingly, the method 100 may further comprise after the time period, locally updating the RTN based on the determined driver profile.

Executable instructions for performing these functions are, optionally, included in a non-transitory computer-readable storage medium or other computer program product configured for execution by one or more processors.

In some embodiments, the system has a buffer of data (e.g., 30 seconds to 60 seconds), such that all sensor data recorded/generated e.g., 20 seconds before and 20 seconds after the ODD exit event are transmitted to the remote entity for offline processing. This may be advantageous in order to be able to perform a complete analysis of the situation that lead to the "critical" ODD exit event, and should therefore include full trajectories of the ego-vehicle, trajectories of other dynamic objects in the surrounding environment of the ego-vehicle, as well as environmental conditions evolving before and after during the "critical" ODD exit event. A "critical" ODD exit event may be understood as an ODD exit event that has a criticality level above the criticality level threshold.

Figure 6:
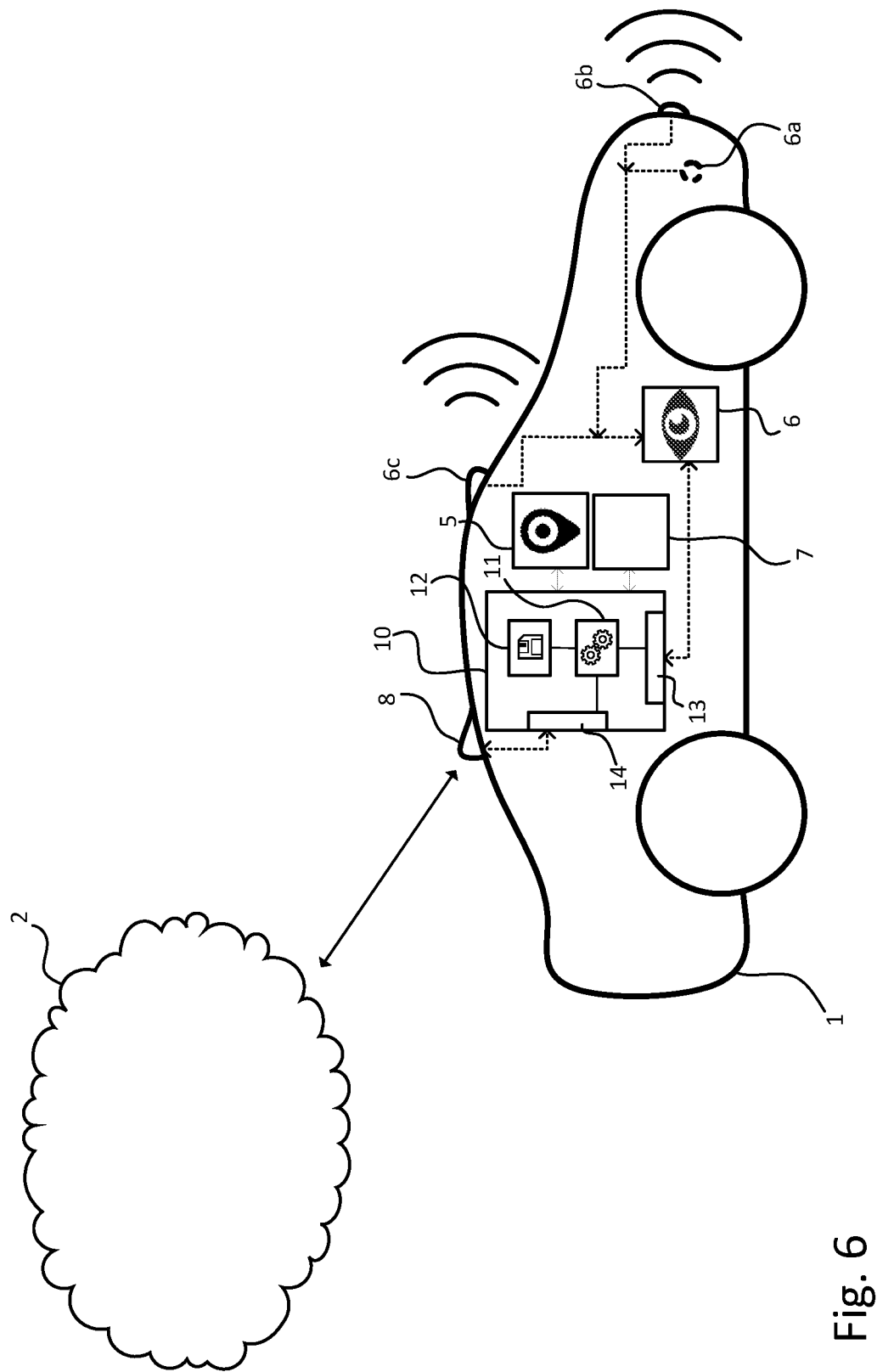
FIG. 6 is a schematic side view of a vehicle comprising a system for estimating a take-over time for an Operational Design Domain (ODD) exit event for an autonomous vehicle in accordance with an embodiment of the present disclosure.

FIG. 6 is a schematic side view of an autonomous vehicle 1 comprising a system 10 for estimating a take-over time for an Operational Design Domain (ODD) exit event for the autonomous vehicle 1. The vehicle is also provided with at least a first ADS feature and a second ADS feature. The first ADS feature is preferably in the form of a fully autonomous feature, i.e. an ADS feature that does not require the driver to be "in-the-loop". The second ADS feature is preferably in the form of a "semi-autonomous" feature (may also be referred to as an ADAS feature), i.e., an ADS feature that requires the driver to be "in-the-loop".

The vehicle 1 further has a perception system 6 comprising at least one sensor 6a-6c for monitoring a surrounding environment of the vehicle 1. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The vehicle 1 further has a localization system 5 configured to monitor a geographical position and heading of the vehicle 1, and may in the form of a Global Navigation Satellite System (GNSS), such as a GPS. However, the localization system may alternatively be realized as a Real Time Kinematics (RTK) GPS in order to improve accuracy. The vehicle 1 is further provided with a Driver Monitoring System (DMS) 7 configured to monitor a driver status of an occupant/driver of the vehicle.

The perception system 6 may refer to any commonly known system and/or functionality, e.g., comprised in one or more electronic control modules and/or nodes of the vehicle 1, adapted and/or configured to interpret sensory information—relevant for driving of the vehicle 1—to identify e.g., obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g., refer to one or a combination of one or more of radar, LIDAR, sonar, camera, navigation system e.g., GPS, odometer and/or inertial measurement units.

The system 10 comprises one or more processors 11, a memory 12, a sensor interface 13 and a communication interface 14. The processor(s) 11 may also be referred to as a control circuit 11 or control circuitry 11. The control circuit 11 is configured to execute instructions stored in the memory 12 to perform a method for updating a system for estimating a take-over time for an ODD exit event for an autonomous vehicle according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is configured to obtain a set of driver status parameters from the DMS 7, the set of driver status parameters being indicative of a current attentiveness level of a driver of the vehicle 1. Then, upon obtaining a signal indicative of an impending ODD exit event, the control circuitry 11 is configured to estimate, by means of the ATN, an action time ($t_{AT}$) for the impending ODD exit event, and to estimate, by means of the RTN, a recovery time ($t_{ERT}$) for the impending ODD exit event based on the obtained set of driver status parameters. Furthermore, the control circuitry 11 is configured to generate, at an output, a hand-over request signal at a first point in time ($t_0$), and determine a second point in time ($t_{DIL}$) when the driver reaches an attentiveness level above the attentiveness threshold in order to obtain an actual time needed for recovery ($t_{ART}$). The control circuitry 11 is further configured to compare the actual time needed for recovery ($t_{ART}$) with the estimated recovery time ($t_{ERT}$) against a recovery time threshold. If the comparison indicates a deviation above the recovery time threshold, the control circuitry is configured to transmit RTN data to a remote entity for globally updating the RTN based on the transmitted RTN data. The control circuitry is further configured to obtain an updated RTN from the remote entity.

Further, the vehicle 1 may be connected to external network(s) 2 via for instance a wireless link (e.g., for communicating with the remote entity). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g., IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 14 may also provide the possibility to acquire sensor data directly or via dedicated sensor control circuitry 6 in the vehicle. The communication/antenna interface 14 may further provide the possibility to send output to a remote location (e.g., remote operator or control centre) by means of the antenna 5. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to estimate a criticality level of the ODD exit event. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

What is claimed is:

1. A system for estimating a take-over time for an Operational Design Domain, ODD, exit event for an autonomous vehicle, the take-over time being indicative of a time needed to delegate a driving task from a first automated driving system, ADS, feature of the vehicle to a driver of the vehicle or a second ADS feature of the vehicle, the system comprising:
an Action Time Network, ATN, configured to output an action time indicative of a time needed to handle the ODD exit event by performing one or more vehicle maneuvers;
a Recovery Time Network, RTN, configured to output a recovery time indicative of a time needed for the driver to reach an attentiveness level above an attentiveness threshold based on a current status of the driver;
control circuitry configured to:
obtain a set of driver status parameters from a driver monitoring system, DMS, of the vehicle, the set of driver status parameters being indicative of a current attentiveness level of a driver of the vehicle;
upon obtaining a signal indicative of an impending ODD exit event:
estimate, by means of the ATN, an action time ($t_{AT}$) for the impending ODD exit event;
estimate, by means of the RTN, a recovery time ($t_{ERT}$) for the impending ODD exit event based on the obtained set of driver status parameters;
generate, at an output, a hand-over request signal at a first point in time ($t_0$);
determine a second point in time ($t_{DIL}$) when the driver reaches an attentiveness level above the attentiveness threshold in order to obtain an actual time needed for recovery ($t_{ART}$);
compare the actual time needed for recovery ($t_{ART}$) with the estimated recovery time ($t_{ERT}$) against a recovery time threshold;
if the comparison indicates a deviation above the recovery time threshold:
transmit RTN data to a remote entity for globally updating the RTN based on the transmitted RTN data;
wherein the control circuitry is further configured to obtain an updated RTN from the remote entity.

2. The system according to claim 1, wherein the transmitted RTN data is indicative of the actual time needed for recovery for the ODD exit event and of RTN input data used to estimate the recovery time ($t_{ERT}$).

3. The system according to claim 1 wherein the control circuitry is further configured to:
locally update the RTN based on the actual time needed for recovery ($t_{ART}$); and
wherein the transmitted RTN data comprises of a set of model parameters indicative of the locally updated RTN.

4. The system according to claim 1, wherein the control circuitry is further configured to:
obtain sensor data comprising information about a surrounding environment of the autonomous vehicle;
detect an ODD exit scenario, at a time of the ODD exit event, based on the obtained sensor data and on the obtained driver status parameters, and determine a set of parameters indicative of a criticality level of the detected ODD exit scenario;
if the comparison between actual time needed for recovery ($t_{ART}$) and the estimated recovery time ($t_{ERT}$) does not indicate the deviation above the recovery time threshold, and if the criticality level of the detected ODD exit scenario is above a criticality level threshold:
transmit ATN data to the remote entity for globally updating the ATN based on the transmitted ATN data; and
wherein the control circuitry is further configured to obtain an updated ATN from the remote entity.

5. The system according to claim 4, wherein the transmitted ATN data is indicative of the criticality level of the ODD exit event and of ATN input data used to estimate the action time ($t_{AT}$).

6. The system according to claim 4 wherein the control circuitry is further configured to:
locally update the ATN based on the determined set of parameters indicative of the criticality level of the ODD exit scenario; and
wherein the transmitted ATN data comprises a set of model parameters indicative of the locally updated ATN to the remote entity.

7. The system according to claim 1, further comprising:
a driver style analysis module configured to analyze and evaluate a performance and attitude of the driver of the vehicle over a time period and to determine driver profile of the driver of the vehicle;
wherein the control circuitry is further configured to:
upon obtaining a signal indicative of an impending ODD exit event:
estimate, by means of the RTN, a recovery time ($t_{ERT}$) for the impending ODD exit event further based on the determined driver profile.

8. A vehicle comprising:
a first Automated Driving System, ADS, feature and a second ADS feature;
a perception system comprising at least one sensor for monitoring a surrounding environment of the vehicle;
a localization system for monitoring a geographical position of the vehicle;
a Driver Monitoring System, DMS, configured to monitor a driver status of an occupant of the vehicle;
a system for estimating a take-over time for an Operational Design Domain, ODD, exit event for an autonomous vehicle, the take-over time being indicative of a time needed to delegate a driving task from the first ADS, feature of the vehicle to a driver of the vehicle or the second ADS feature of the vehicle, the system comprising:
an Action Time Network, ATN, configured to output an action time indicative of a time needed to handle the ODD exit event by performing one or more vehicle maneuvers;
a Recovery Time Network, RTN, configured to output a recovery time indicative of a time needed for the driver to reach an attentiveness level above an attentiveness threshold based on a current status of the driver;
control circuitry configured to:
obtain a set of driver status parameters from a driver monitoring system, DMS, of the vehicle, the set of driver status parameters being indicative of a current attentiveness level of a driver of the vehicle;
upon obtaining a signal indicative of an impending ODD exit event:
estimate, by means of the ATN, an action time ($t_{AT}$) for the impending ODD exit event;
estimate, by means of the RTN, a recovery time ($t_{ERT}$) for the impending ODD exit event based on the obtained set of driver status parameters;
generate, at an output, a hand-over request signal at a first point in time (t0);
determine a second point in time ($t_{DIL}$) when the driver reaches an attentiveness level above the attentiveness threshold in order to obtain an actual time needed for recovery ($t_{ART}$);
compare the actual time needed for recovery ($t_{ART}$) with the estimated recovery time ($t_{ERT}$) against a recovery time threshold; and
if the comparison indicates a deviation above the recovery time threshold:
transmit RTN data to a remote entity for globally updating the RTN based on the transmitted RTN data, wherein the control circuitry is further configured to obtain an updated RTN from the remote entity.

9. A method for updating a system for estimating a take-over time for an Operational Design Domain, ODD, exit event for an autonomous vehicle, the take-over time being indicative of a time needed to delegate a driving task from a first automated driving system, ADS, feature of the vehicle to a driver of the vehicle or a second ADS feature of the vehicle,
wherein the system for estimating a take-over time comprises:
an Action Time Network, ATN, configured to output an action time indicative of a time needed to handle the ODD exit event by performing one or more vehicle maneuvers;
a Recovery Time Network, RTN, configured to output a recovery time indicative of a time needed for the driver to reach an attentiveness level above an attentiveness threshold based on a current status of the driver;
wherein the method comprises:
obtaining a set of driver status parameters from a driver monitoring system, DMS, of the vehicle, the set of driver status parameters being indicative of a current attentiveness level of a driver of the vehicle;
upon obtaining a signal indicative of an impending ODD exit event:
estimating, by means of the ATN, an action time ($t_{AT}$) for the impending ODD exit event;
estimating, by means of the RTN, a recovery time ($t_{ERT}$) for the impending ODD exit event based on the obtained set of driver status parameters;
generating a hand-over request signal at a first point in time (t0);
determining a second point in time ($t_{DIL}$) when the driver reaches an attentiveness level above the attentiveness threshold in order to obtain an actual time needed for recovery ($t_{ART}$);
comparing the actual time needed for recovery ($t_{ART}$) with the estimated recovery time ($t_{ERT}$) against a recovery time threshold;
if the comparison indicates a deviation above the recovery time threshold:
transmitting RTN data to a remote entity for globally updating the RTN based on the transmitted RTN data;
wherein the method further comprises obtaining an updated RTN from the remote entity.

10. The method according to claim 9, wherein the transmitted RTN data is indicative of the actual time needed for recovery for the ODD exit event and of RTN input data used to estimate the recovery time ($t_{ERT}$).

11. The method according to claim 9, further comprising:
locally updating the RTN based on the actual time needed for recovery ($t_{ART}$); and
wherein the transmitted RTN data comprises a set of model parameters indicative of the locally updated RTN.

12. The method according to claim 9, further comprising:
obtaining sensor data comprising information about a surrounding environment of the autonomous vehicle;
detecting an ODD exit scenario, at a time of the ODD exit event, based on the obtained sensor data and on the obtained driver status parameters, and determining a set of parameters indicative of a criticality level of the detected ODD exit scenario;
if the comparison between actual time needed for recovery ($t_{ART}$) and the estimated recovery time ($t_{ERT}$) does not indicate the deviation above the recovery time threshold , and if the criticality level of the detected ODD exit scenario is above a criticality level threshold:
transmitting ATN data to the remote entity for globally updating the ATN based on the transmitted ATN data; and
wherein the method further comprises obtaining an updated ATN from the remote entity.

13. The method according to claim 12, wherein the transmitted ATN data is indicative of the criticality level of the ODD exit event and of ATN input data used to estimate the action time ($t_{AT}$).

14. The method according to claim 12, further comprising:
- locally updating the ATN based on the determined set of parameters indicative of the criticality level of the ODD exit scenario; and
- wherein the transmitted ATN data comprises a set of model parameters indicative of the locally updated ATN to the remote entity.

15. A non-transitory computer-readable storage medium storing one or more instructions which, when executed by one or more processors of a vehicle control system, the one or more instructions for performing the method according to claim 9.

* * * * *